United States Patent

Doppler et al.

(10) Patent No.: US 10,015,761 B2
(45) Date of Patent: Jul. 3, 2018

(54) APPARATUS AND METHOD FOR CHANNEL ACCESS FOR LONG TERM EVOLUTION NODES IN UNLICENSED BAND

(71) Applicant: Nokia Technologies Oy, Espoo (FI)

(72) Inventors: Klaus Doppler, Albany, CA (US); Sayantan Choudhury, Berkeley, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/502,719

(22) Filed: Sep. 30, 2014

(65) Prior Publication Data

US 2016/0095117 A1    Mar. 31, 2016

(51) Int. Cl.
| | |
|---|---|
| *H04W 72/00* | (2009.01) |
| *H04W 56/00* | (2009.01) |
| *H04W 16/14* | (2009.01) |
| *H04W 74/08* | (2009.01) |

(52) U.S. Cl.
CPC ......... *H04W 56/001* (2013.01); *H04W 16/14* (2013.01); *H04W 74/0808* (2013.01)

(58) Field of Classification Search
CPC .......................... H04W 16/14; H04W 56/001
USPC ....................... 455/454, 434, 435.1
See application file for complete search history.

(56) References Cited

U.S. PATENT DOCUMENTS

| | | | |
|---|---|---|---|
| 2004/0018851 A1* | 1/2004 | Koenck | G06F 1/1698 455/550.1 |
| 2010/0195601 A1* | 8/2010 | Zhang | H04W 74/04 370/329 |
| 2015/0327232 A1* | 11/2015 | Chang | H04W 56/00 370/329 |
| 2016/0095110 A1* | 3/2016 | Li | H04W 72/1215 370/329 |

* cited by examiner

*Primary Examiner* — Chuck Huynh
(74) *Attorney, Agent, or Firm* — Squire Patton Boggs (US) LLP

(57) ABSTRACT

One embodiment is directed to a method comprising sensing, by an apparatus, a shared channel; determining whether the shared channel is free; determining whether a synchronization signal has been received; and based on that the shared channel is determined free and the synchronization signal is determined received, beginning to access the shared channel.

18 Claims, 4 Drawing Sheets

APPARATUS AND METHOD FOR CHANNEL ACCESS FOR LONG TERM EVOLUTION NODES IN UNLICENSED BAND

TECHNICAL FIELD

The present application relates generally to an apparatus and a method for channel access for long term evolution nodes in unlicensed band.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application.

As the number of wireless cellular data communication devices continues to increase and as their data capabilities continue to be more and more heavily used, the usage on the available frequencies dedicated to cellular data communication comes closer and closer to saturation. One approach to the management of traffic load is the offloading of traffic onto unlicensed frequencies, such as those used by wireless local area networks (WLAN), whose presence may be represented by one or more access points (Aps). Network operators may implement wireless network infrastructure, which uses unlicensed frequencies, and manage the transfer of traffic between base stations using licensed frequencies and unlicensed network access points. Such an approach may be used, for example, by 3rd Generation Partnership Project (3GPP) long term evolution (LTE) or LTE-advanced (LTE-A) networks. The efficient use of unlicensed frequencies and the efficient transfer of traffic between base stations using licensed frequencies and access points using unlicensed frequencies has the potential to greatly increase wireless data capacity.

SUMMARY

Various aspects of examples of the invention are set out in the claims.

According to a first aspect of the present invention, a method may include by an apparatus, sensing a shared channel; determining whether the shared channel is free; determining whether a synchronization signal has been received; and based on that the shared channel is determined free and the synchronization signal is determined received, beginning to access the shared channel.

According to a second aspect of the present invention, an apparatus may include at least one processor, and at least one memory including computer program code, wherein the at least one memory and the computer program code configured to, with the at least one processor, cause the apparatus at least to sense a shared channel; determine whether the shared channel is free; determine whether a synchronization signal has been received; and based on that the shared channel is determined free and the synchronization signal is determined received, begin to access the shared channel.

According to a third aspect of the present invention, a computer program product comprising a computer-readable medium bearing computer program code embodied therein for use with a computer, the computer program code may include code for sensing a shared channel; code for determining whether the shared channel is free; code for determining whether a synchronization signal has been received; and code for based on that the shared channel is determined free and the synchronization signal is determined received, beginning to access the shared channel.

According to a fourth aspect of the present invention, an apparatus may include means for sensing a shared channel; means for determining whether the shared channel is free; means for determining whether a synchronization signal has been received; and means for based on that the shared channel is determined free and the synchronization signal is determined received, beginning to access the shared channel.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
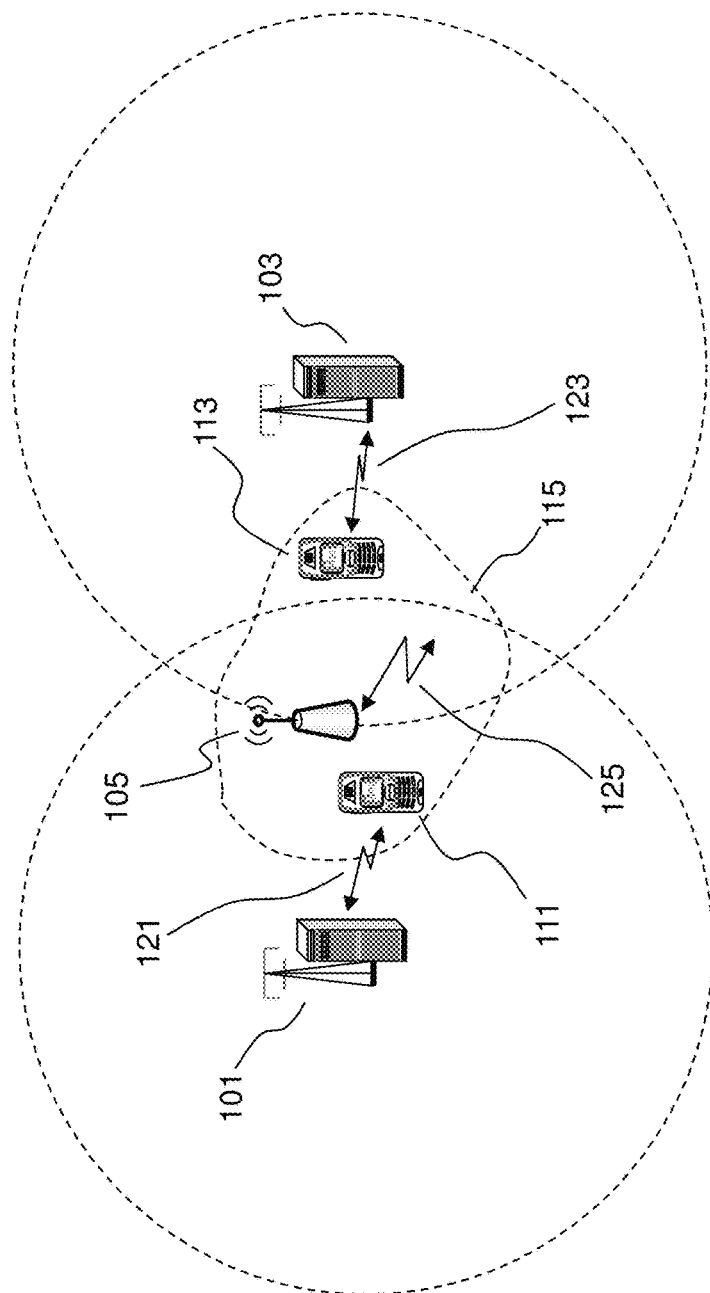
FIG. 1 illustrates an example wireless system in accordance with an example embodiment of the application.

FIG. 1 illustrates an example wireless system in accordance with an example embodiment of the application. The example wireless system comprises two $3^{rd}$ generation partnership project (3GPP) network elements (NEs), 101 and 103. The NEs may be LTE evolved NodeBs (eNBs), connecting to a core network that is not shown for brevity, or may be femto/pico cell base stations in a heterogeneous scenario. The NEs may communicate with each other through such as for example, an X2 interface or an air interface. The NEs 101 and 103 are configured to communicate with one or more user equipment (UEs), 111 and 113 by wireless links 121 and 123, respectively. The example wireless system also comprises an unlicensed network such as for example, wireless local area network (WLAN), under an access point (AP), 105. The WLAN AP 105 is configured to provide wireless connections in the WLAN local area to devices, such as for example the WLAN station 115 by wireless link 125. In the example embodiment of FIG. 1, since the WLAN local area overlaps with the coverage areas of NEs 101 and 103, the wireless links 121, 123 and 125 may share the same unlicensed band. Although just two LTE NEs, two UEs, one WLAN AP and one WLAN station are shown in FIG. 1, the example wireless system may comprise more or fewer NEs, UEs, WLAN APs and stations.

The channel access for LTE nodes, either base stations or UEs, in unlicensed bands needs to be defined. Traditional channel access mechanisms have some form of interference avoidance such as channel hopping or sensing mechanisms. WLAN typically uses listen before talk mechanisms for channel access which is a good solution for sparse wireless deployments. However, in dense deployment, sensing overhead can become quite large resulting in low throughput.

Listen before talk mechanism in WLAN works in the following manner. A WLAN node, either an AP or a station, which needs to access the channel, senses the channel for a pre-defined time period and if the channel is free, it accesses the channel. On the other hand if the channel is busy, it backs off from transmission for a random period of time. At the end of the initial random backoff, the node takes part in actual data transmission and if the transmission fails, it tries again after doubling the backoff window duration. The doubling of the backoff window is done in order to reduce the collision probability. While in a sparse wireless deployment, the backoff mechanism works well (since the collision probability is quite low), in a dense deployment, the increased collisions may lead to higher likelihood of a large backoff window.

WLAN transmissions are mainly unsynchronized, i.e., the nodes can transmit any time if the channel is free. On the other hand, for LTE transmissions, the channel access is synchronized, i.e. there are fixed channel access times for the nodes. In particular, the LTE UE and base stations can transmit only at fixed times. Also, femto/pico eNBs are likely to be synchronized with a macro eNB operating on a licensed carrier to allow e.g. cross carrier scheduling. Hence, if straightforward listen before talk mechanisms are employed, the channel access mechanism may become less efficient than in the case of WLAN transmission. For instance, in WLAN, once the channel is sensed free after backoff, any node can transmit. However, for LTE nodes, not only the channel has to be free, but also it has to ensure that it is free at the slot boundary. As an example, the WLAN transmission can be silent in between slot boundaries but if the shared channel is busy during LTE slots boundaries, then LTE nodes may not use the channel. This may put LTE transmissions at a further disadvantage compared to WLAN transmissions.

In an example embodiment, a LTE node uses a random backoff mechanism for channel access. When it is able to access the channel, it may send a channel access signal to other LTE nodes indicating that the channel is free for LTE access. In an example embodiment, for a time division duplex (TDD), the LTE node may also indicate in the channel access signal, the downlink/uplink (DL/UL) bit map for the next few frames. Basically, by receiving this channel access signal, another LTE node can synchronize itself to a neighbor node in its vicinity and also get out of its backoff stage. The terms "channel access signal" and "sync signal" will be used interchangeably during the illustration below. In an example embodiment, the sync signal may be a pre-defined signal with good auto/cross-correlation properties that every LTE node can identify, such as for example, a Zadoff Chu sequence.

Figure 2:
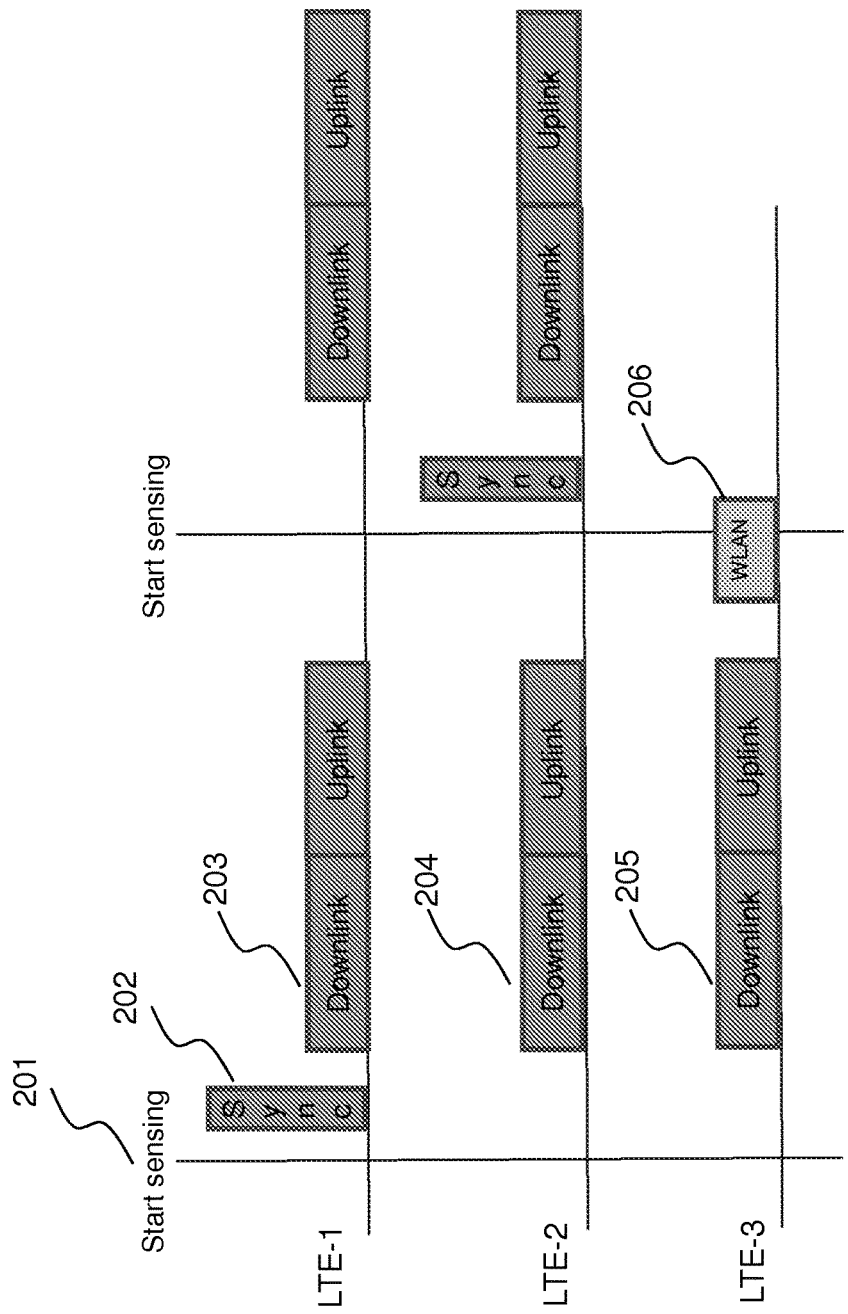
FIG. 2 illustrates an example of using sync signal for channel access in accordance with an example embodiment of the application.

FIG. 2 illustrates an example of using sync signal for channel access in accordance with an example embodiment of the application. In the example of FIG. 2, there are three LTE nodes, LTE-1, 2 and 3, such as for example, those from the nodes 101, 111, 103 and 113 in FIG. 1. The LTE nodes are in a random backoff stage and one of the nodes, LTE-1, senses that the channel is free for transmission at 201. Hence, LTE-1 node transmits a sync signal at 202 indicating that it is going to access the channel at 203 after a duration of time. The duration may be predefined and typically takes into account the time it takes for the other LTE-nodes to receive the sync signal from LTE-1. After receiving the sync signal from LTE-1, the other LTE nodes, LTE-2 and LTE-3 in this example, irrespective of their backoff stages, can access the channel at 204 and 205, respectively, if the channel is free in their vicinity. In another word, LTE-2 and LTE-3 may terminate their backoff mechanism based on receiving the sync signal. In an example embodiment, the channel is considered free if the sensed energy is below a threshold during a minimum amount of time. In another example embodiment, the channel sensing may be based on the detection of a specific signal, or/and based on guard interval detection, such as for example, the cyclic prefix length estimation. If the other LTE node senses that the channel is not free due to WLAN transmission in its vicinity, such as for example, the LTE-3 at 206, it will not begin the channel access.

In an example embodiment, when a node finds that the channel is busy, it may sense the channel for minimum sensing interval of X µs, such as for example, a distributed coordination function interframe space (DIFS) duration as defined in WLAN. After the minimum sensing interval, if the channel is determined not free, the node may choose a backoff window. The backoff window is typically a multiple of the minimum backoff slot. In the example of FIG. 2, if the minimum backoff slot duration is Y µs for the $1^{st}$ stage of backoff, the node LTE-1 is assumed to use a random number of backoff slots $Z\_1 \times Y$ µs. Similarly, LTE-2 and LTE-3 may choose a duration of $Z\_2 \times Y$ µs and $Z\_3 \times Y$ µs, respectively. For simplicity, let us assume $Z\_1 < Z\_2 < Z\_3$ in the above example and that LTE-1 node becomes free first. Hence, it transmits the sync signal to LTE-2 and LTE-3 nodes which can access the channel (assuming that the channel in their local vicinity is free for a predefined duration). Hence, the backoff time saved for LTE-2 and LTE-3 nodes are $(Z\_2-Z\_1) \times Y$ µs and $(Z\_3-Z\_1) \times Y$ µs, respectively. Furthermore, both LTE-2 and LTE-3 nodes are also synchronized to each other and to LTE-1. Therefore, the LTE nodes may be able to transmit at the same time.

Enabling multiple LTE networks to transmit at the same time greatly improves the spectrum utilization and ultimately the user throughput. There will be multiple channels available in the license exempt band and intelligent channel selection can be used to choose a channel free from harmful interference. Additionally, the sync signal could contain information that can assist the other LTE nodes such as for example the UL/DL allocation of the transmitting node. This information can help the other LTE networks configure their traffic pattern based on their traffic and interference pattern. For instance, if the downlink from LTE-1 interferes more with LTE-2 network, then LTE-2 can configure its uplink when LTE-1 is using downlink transmission and vice-versa.

In an example embodiment, during the X µs minimum sensing interval, if a node senses that the channel is free, it may send a SYNC signal and begin to transmit data packet after a predefined period. If a node receives a SYNC signal during the X µs minimum sensing interval and also senses that the channel is free, it may begin to access the channel after a predefined period.

Figure 3:
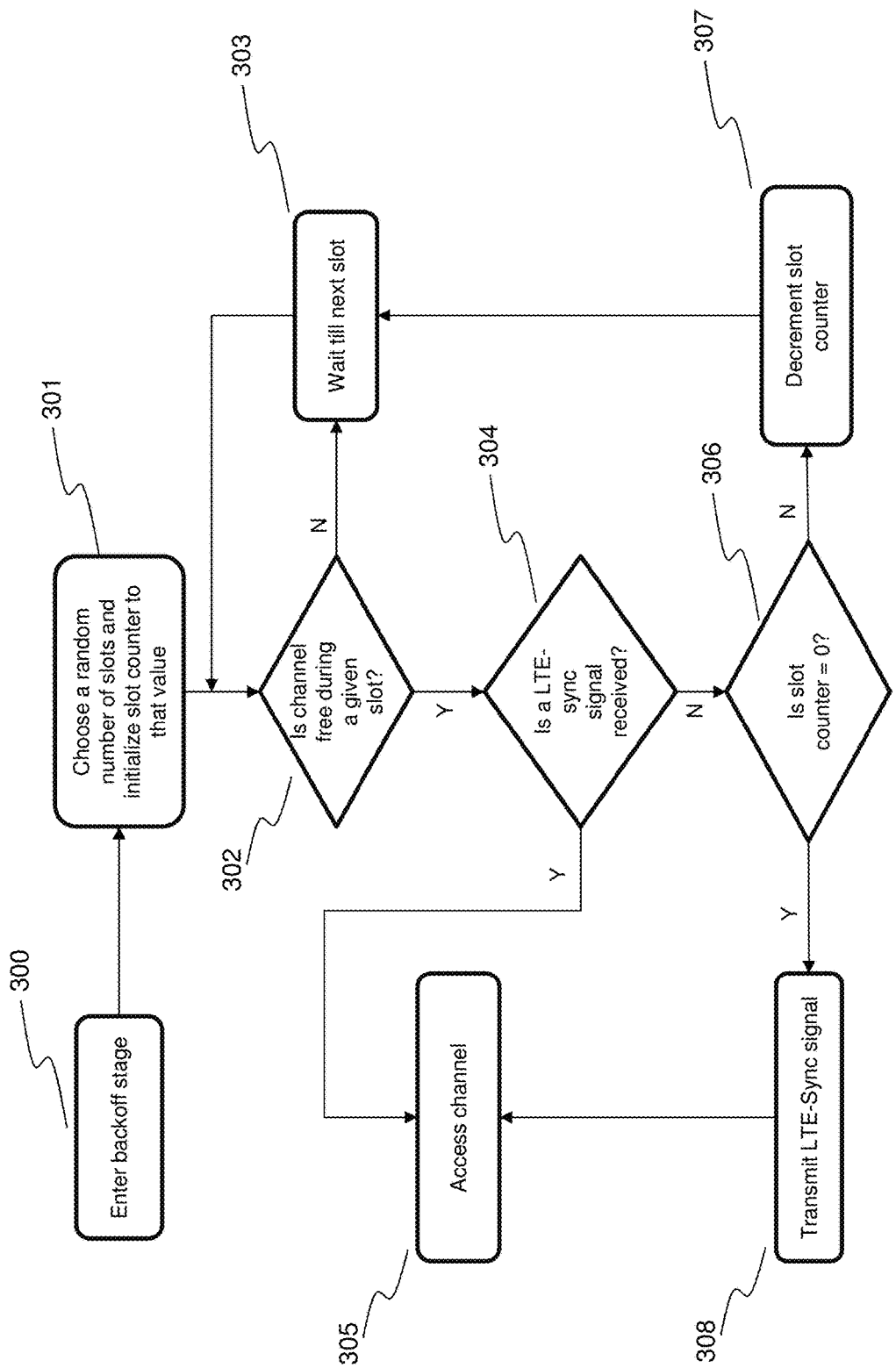
FIG. 3 illustrates a flowchart utilized in backoff stage in accordance with an example embodiment of the application.

In an example embodiment, if the channel is determined busy during the X µs minimum sensing interval, the node may enter the backoff stage. FIG. 3 illustrates a flowchart utilized in backoff stage in accordance with an example embodiment of the application. In the example of FIG. 3, a LTE node, such as for example, the LTE-1, LTE-2 or LTE-3 of FIG. 2, enters the backoff stage at step 300. The node chooses a random number of backoff slots and initiates a slot counter to that value at step 301. At step 302, the node senses whether the channel is free during a given slot. If the channel is not free, the node waits for the next slot at 303 and performs the sensing again. If the channel is free, the node checks whether a SYNC signal has been received at 304. If a SYNC signal has been received, the node may begin to access the channel at step 305 after a predefined period. If the SYNC signal has not been received at 304, the node checks whether the slot counter is equal to zero at step 306. If the slot counter is not zero, the slot counter is decremented and the node waits for the next slot to perform the channel sensing again. If the slot counter is zero, the node may transmit a SYNC signal to other LTE nodes at 308 and then begin to access the channel at 305 after a predefined time.

It will be recognized that performing a channel sensing and checking SYNC signal need not be done sequentially, but that the presentation here is simply for convenience in illustrating procedures that may be performed. For example, the order of channel sensing 302 and checking SYNC signal 304 may be different, or they may be performed in parallel. In an example embodiment, after receiving the SYNC signal, the node may continue the channel sensing until the end of the current backoff slot, or during a predefined period.

Figure 4:
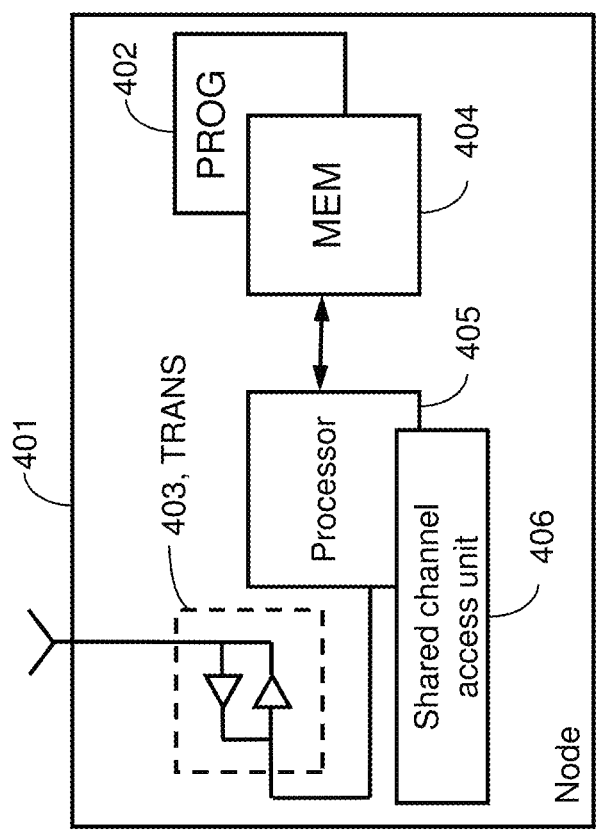
FIG. 4 illustrates a simplified block diagram of example apparatus that is suitable for use in practicing various example embodiments of this application.

Reference is made to FIG. 4 for illustrating a simplified block diagram of example apparatus that is suitable for use in practicing various example embodiments of this application. In FIG. 4, a LTE node, 401, such as for example, those from the nodes 101, 111, 103 and 113 in FIG. 1, or LTE-1, LTE-2 and LTE-3 of FIG. 2, includes at least one processor 405, at least one memory (MEM) 404 coupled to the at least one processor 405, and a suitable transceiver (TRANS) 403 (having a transmitter (TX) and a receiver (RX)) coupled to the at least one processor 405. The at least one MEM 404 stores a program (PROG) 402. The TRANS 403 is for bidirectional wireless communications. The node 401 may be coupled to one or more cellular networks or systems, which is not shown in this figure.

As shown in FIG. 4, the node 401 may further include a shared channel access unit 406. The unit 406, together with the at least one processor 405 and the PROG 402, may be utilized by the node 401 in conjunction with various example embodiments of the application, as described herein.

The PROG 402 is assumed to include program instructions that, when executed by the associated processor, enable the electronic apparatus to operate in accordance with the example embodiments of this disclosure, as discussed herein.

In general, the various example embodiments of the apparatus 401 can include, but are not limited to, macro cell/femto cell/pico cell eNBs, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The example embodiments of this disclosure may be implemented by computer software or computer program code executable by the processor 405 of the node 401, or by hardware, or by a combination of software and hardware.

The MEM 404 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The processor 405 may be of any type suitable to the local technical environment, and may include one or more of general purpose computers, special purpose computers, microprocessors, digital signal processors (DSPs) and processors based on multi-core processor architecture, as non-limiting examples.

Without in any way limiting the scope, interpretation, or application of the claims appearing below, a technical effect of one or more of the example embodiments disclosed herein may be maintaining the synchronization between LTE nodes even in unlicensed bands. Another technical effect may be that the LTE node can get out of its backoff stage faster and also ensure that it is synchronized to other LTE nodes in its vicinity. When additional information such as UL/DL allocation bitmap is included in proposed SYNC signal, it can be used by other nodes to align similar/different traffic patterns based on the interference conditions.

Embodiments of the present invention may be implemented in software, hardware, application logic or a combination of software, hardware and application logic. The software, application logic and/or hardware may reside on an apparatus such as a user equipment, a NodeB or other mobile communication devices. If desired, part of the software, application logic and/or hardware may reside on a node 401, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

It is also noted herein that while the above describes example embodiments of the invention, these descriptions should not be viewed in a limiting sense. Rather, there are several variations and modifications which may be made without departing from the scope of the present invention as defined in the appended claims.

For example, the example embodiment of FIG. 2 has assumed that the LTE nodes employ a LTE TDD framework. It is straightforward to generalize the idea to cover the frequency division duplex (FDD) framework.

Further, the various names used for the described parameters are not intended to be limiting in any respect, as these parameters may be identified by any suitable names.

If desired, the different functions discussed herein may be performed in a different order and/or concurrently with each other. Furthermore, if desired, one or more of the above-described functions may be optional or may be combined. As such, the foregoing description should be considered as merely illustrative of the principles, teachings and example embodiments of this invention, and not in limitation thereof.

What is claimed is:

1. A method, comprising:
   sensing, by an apparatus, a shared channel;
   determining whether the shared channel is free;
   determining whether a synchronization signal has been received; and
   based on whether the shared channel is determined free and whether the synchronization signal is determined received, beginning to access the shared channel, wherein the synchronization signal indicates to terminate a backoff mechanism and access the shared channel, and wherein the sensing the shared channel is performed separately from determining whether the synchronization signal has been received, the sensing is performable before or after the determining whether the synchronization signal has been received.

2. The method of claim 1, further comprising:
selecting a number of slots for a backoff time period; and
initializing a slot counter.

3. The method of claim 2, wherein a number of slots for the backoff time period is selected when the shared channel has been determined not free.

4. The method of claim 2, further comprising:
when the shared channel is determined not free, repeating the steps of sensing the shared channel, determining whether the shared channel is free, and determining whether the synchronization signal has been received.

5. The method of claim 2, further comprising:
when the shared channel is determined free and the synchronization signal is determined not received, decrementing the slot counter; and
if the slot counter is not equal to zero, repeating the steps of sensing the shared channel, determining whether the shared channel is free, and determining whether the synchronization signal has been received; and
if the slot counter is equal to zero, transmitting a synchronization signal.

6. The method of claim 1, wherein beginning to access the shared channel is after a predefined period from the determination that the synchronization signal has been received.

7. An apparatus, comprising:
at least one processor;
and at least one memory including computer program code,
wherein the at least one memory and the computer program code are configured to, with the at least one processor, cause the apparatus at least to:
sense a shared channel;
determine whether the shared channel is free;
determine whether a synchronization signal has been received; and
based on whether the shared channel is determined free and whether the synchronization signal is determined received, begin to access the shared channel, wherein the synchronization signal indicates to terminate a backoff mechanism and access the shared channel, and wherein the sensing the shared channel is performed separately from determining whether the synchronization signal has been received, the sensing is performable before or after the determining whether the synchronization signal has been received.

8. The apparatus according to claim 7, wherein the at least one memory and the computer program code are configured to, with the at least one processor, cause the apparatus at least further to:
select a number of slots for a backoff time period; and
initialize a slot counter.

9. The apparatus of claim 8, wherein a number of slots for the backoff time period is selected when the shared channel has been determined not free.

10. The apparatus according to claim 8, wherein the at least one memory and the computer program code are configured to, with the at least one processor, cause the apparatus at least further to:
when the shared channel is determined not free, repeat the steps of sensing the shared channel, determining whether the shared channel is free, and determining whether the synchronization signal has been received.

11. The apparatus according to claim 8, wherein the at least one memory and the computer program code are configured to, with the at least one processor, cause the apparatus at least further to:
when the shared channel is determined free and the synchronization signal is determined not received, decrement the slot counter; and
if the slot counter is not equal to zero, repeat the steps of sensing the shared channel, determining whether the shared channel is free, and determining whether the synchronization signal has been received; and
if the slot counter is equal to zero, transmit a synchronization signal.

12. The apparatus of claim 7, wherein the apparatus begins to access the shared channel after a predefined period from the determination that the synchronization signal has been received.

13. A computer program product comprising a non-transitory computer-readable medium bearing computer program code embodied therein for use with a computer, the computer program product configured to control a processor of the computer to perform a method, comprising:
sensing a shared channel;
determining whether the shared channel is free;
determining whether a synchronization signal has been received; and
beginning to access the shared channel, based on whether the shared channel is determined free and whether the synchronization signal is determined received, wherein the synchronization signal indicates to terminate a backoff mechanism and access the shared channel, and wherein the sensing the shared channel is performed separately from determining whether the synchronization signal has been received, the sensing is performable before or after the determining whether the synchronization signal has been received.

14. The computer program product according to claim 13, the method further comprising:
selecting a number of slots for a backoff time period; and
initializing a slot counter.

15. The computer program product according to claim 14, wherein a number of slots for the backoff time period is selected when the shared channel has been determined not free.

16. The computer program product according to claim 14, the method further comprising:
when the shared channel is determined not free, repeating the steps of sensing the shared channel, determining whether the shared channel is free, and determining whether the synchronization signal has been received.

17. The computer program product according to claim 14, the method further comprising:
when the shared channel is determined free and the synchronization signal is determined not received, decrementing the slot counter; and
if the slot counter is not equal to zero, repeating the steps of sensing the shared channel, determining whether the shared channel is free, and determining whether the synchronization signal has been received; and
if the slot counter is equal to zero, transmitting a synchronization signal.

18. The computer program product according to claim 13, wherein beginning to access the shared channel is after a predefined period from the determination that the synchronization signal has been received.

* * * * *